United States Patent
Mitchell et al.

(10) Patent No.: US 8,091,918 B2
(45) Date of Patent: Jan. 10, 2012

(54) DOUBLE-SEWN AIRBAG MOUNTING ASSEMBLIES

(75) Inventors: Abe Mitchell, Brigham City, UT (US); Mark Hatfield, Providence, UT (US)

(73) Assignee: Autoliv ASP, Inc., Ogden, UT (US)

( * ) Notice: Subject to any disclaimer, the term of this patent is extended or adjusted under 35 U.S.C. 154(b) by 213 days.

(21) Appl. No.: 12/689,813

(22) Filed: Jan. 19, 2010

(65) Prior Publication Data

US 2011/0175333 A1 Jul. 21, 2011

(51) Int. Cl.
*B60R 21/20* (2011.01)
*B60R 21/214* (2011.01)

(52) U.S. Cl. ................... 280/728.2; 280/730.2

(58) Field of Classification Search ........... 280/728.2, 280/730.2
See application file for complete search history.

(56) References Cited

U.S. PATENT DOCUMENTS

| | | | |
|---|---|---|---|
| 5,746,690 A | 5/1998 | Humbarger et al. |
| 5,899,486 A | 5/1999 | Ibe |
| 5,944,342 A | 8/1999 | White et al. |
| 6,073,961 A | 6/2000 | Bailey et al. |
| 6,099,026 A | 8/2000 | Ando et al. |
| 6,209,907 B1 | 4/2001 | Fischer |
| 6,223,389 B1 | 5/2001 | Walsh et al. |
| 6,305,707 B1 | 10/2001 | Ishiyama et al. |
| 6,412,810 B1 | 7/2002 | Wipasuramonton et al. |
| 6,415,560 B1 | 7/2002 | Rinderer |
| 6,550,809 B1 | 4/2003 | Masuda et al. |
| 6,626,456 B2 | 9/2003 | Terbu et al. |
| 6,672,612 B2 | 1/2004 | Sauer et al. |
| 6,705,635 B2 | 3/2004 | Hoeft et al. |
| 6,743,162 B2 | 6/2004 | Hieber et al. |

(Continued)

FOREIGN PATENT DOCUMENTS

DE 10 2005 012 845 9/2006

(Continued)

OTHER PUBLICATIONS

Office Action mailed Oct. 1, 2010 in co-pending U.S. Appl. No. 12/495,243, now published as U.S. Patent Application Publication No. US 2010/0327564.
Office Action mailed Oct. 18, 2010 in co-pending U.S. Appl. No. 12/507,699.
Notification of Transmittal of the International Search Report and the Written Opinion of the International Searching Authority issued Oct. 26, 2010 in International Application No. PCT/US2010/047258.
Notification of Transmittal of the International Search Report and the Written Opinion of the International Searching Authority issued Oct. 20, 2010 in International Application No. PCT/US2010/046113.

(Continued)

*Primary Examiner* — Paul N Dickson
*Assistant Examiner* — Barry Gooden, Jr.
(74) *Attorney, Agent, or Firm* — Sally J. Brown; Stoel Rives

(57) ABSTRACT

Mounting assemblies can be used to attach an inflatable curtain airbag to a vehicle structure. Mounting assemblies can include a mounting member, a connecting member, and an optional wrapper. The connecting member is attached to the mounting member and the airbag via stitching, which can be categorized according to the primary direction of stress that may be placed on the stitching during airbag deployment. Stitching in shear is stronger than otherwise identical stitching in peel; however, a preferred method of packaging a curtain airbag results in a b-rolled airbag that can not be attached to the connecting member with shear stitching alone. Peel stitching alone may not be strong enough to retain an occupant within the vehicle during a rollover event. As such, a combination of a folded connecting member, shear stitching, and peel stitching allows a b-roll airbag to meet occupant ejection mitigation requirements.

16 Claims, 10 Drawing Sheets

U.S. PATENT DOCUMENTS

| | | | |
|---|---|---|---|
| 6,749,220 | B1 | 6/2004 | Wipasuramonton et al. |
| 6,758,490 | B2 | 7/2004 | Hoeft et al. |
| 6,796,576 | B2 | 9/2004 | Aoki et al. |
| 6,851,702 | B2 | 2/2005 | Henderson et al. |
| 6,889,999 | B2 | 5/2005 | Dominissini et al. |
| 6,902,187 | B2 | 6/2005 | Sonnenberg |
| 6,991,256 | B2 | 1/2006 | Henderson et al. |
| 7,083,188 | B2 | 8/2006 | Henderson et al. |
| 7,097,200 | B2 | 8/2006 | Wold |
| 7,121,579 | B2 | 10/2006 | Ochiai et al. |
| 7,125,037 | B2 | 10/2006 | Tallerico et al. |
| 7,159,896 | B2 | 1/2007 | Ochiai et al. |
| 7,163,231 | B2 | 1/2007 | Kumagai |
| 7,172,212 | B2 | 2/2007 | Aoki et al. |
| 7,261,316 | B1 * | 8/2007 | Salmo et al. ............... 280/730.2 |
| 7,261,682 | B2 | 8/2007 | Cookston et al. |
| 7,328,911 | B2 | 2/2008 | Chapman |
| 7,344,154 | B2 | 3/2008 | Yokoyama et al. |
| 7,357,408 | B2 | 4/2008 | Hall et al. |
| 7,407,182 | B2 | 8/2008 | Aoki et al. |
| 7,478,826 | B2 | 1/2009 | Soderquist et al. |
| 7,547,038 | B2 | 6/2009 | Coleman |
| 7,568,730 | B2 | 8/2009 | Kwon |
| 7,641,220 | B2 | 1/2010 | Visker et al. |
| 7,731,224 | B2 | 6/2010 | Enriquez et al. |
| 7,823,914 | B2 | 11/2010 | Cheal et al. |
| 7,980,585 | B2 | 7/2011 | Cheal |
| 8,006,998 | B2 | 8/2011 | Hatfield et al. |
| 2002/0158450 | A1 | 10/2002 | Hoeft et al. |
| 2002/0195803 | A1 | 12/2002 | Terbu et al. |
| 2003/0006589 | A1 | 1/2003 | Aoki et al. |
| 2003/0042712 | A1 | 3/2003 | Henderson et al. |
| 2003/0184957 | A1 | 10/2003 | Kumagai |
| 2004/0000775 | A1 | 1/2004 | Henderson et al. |
| 2005/0010335 | A1 | 1/2005 | Kettenacker et al. |
| 2005/0029778 | A1 | 2/2005 | Weber et al. |
| 2005/0046154 | A1 | 3/2005 | Rhea et al. |
| 2005/0104335 | A1 | 5/2005 | Henderson et al. |
| 2005/0110256 | A1 | 5/2005 | Cookston et al. |
| 2005/0121887 | A1 | 6/2005 | Inoue et al. |
| 2005/0179238 | A1 | 8/2005 | Kippschull et al. |
| 2005/0206138 | A1 | 9/2005 | Breuninger et al. |
| 2005/0236815 | A1 | 10/2005 | Kismir et al. |
| 2006/0043703 | A1 | 3/2006 | Enriquez |
| 2006/0119084 | A1 | 6/2006 | Coon et al. |
| 2006/0138762 | A1 | 6/2006 | Jang |
| 2006/0192368 | A1 | 8/2006 | Hall et al. |
| 2006/0197316 | A1 | 9/2006 | Watanabe |
| 2006/0237957 | A1 | 10/2006 | Woydick |
| 2007/0003390 | A1 | 1/2007 | Kawai |
| 2007/0019891 | A1 | 1/2007 | Daniel |
| 2007/0024031 | A1 | 2/2007 | Coleman |
| 2007/0090630 | A1 | 4/2007 | Wilmot |
| 2007/0090634 | A1 | 4/2007 | Jang et al. |
| 2007/0126211 | A1 | 6/2007 | Moerke et al. |
| 2007/0216139 | A1 | 9/2007 | Mazanek et al. |
| 2007/0296189 | A1 | 12/2007 | Berntsson et al. |
| 2008/0061535 | A1 | 3/2008 | Everard et al. |
| 2008/0197610 | A1 | 8/2008 | Downey |
| 2008/0217892 | A1 | 9/2008 | Maripudi et al. |
| 2008/0217896 | A1 | 9/2008 | Visker et al. |
| 2008/0224457 | A1 | 9/2008 | Brough et al. |
| 2008/0284142 | A1 | 11/2008 | Cheal et al. |
| 2010/0270775 | A1 * | 10/2010 | Enders et al. ............... 280/728.2 |
| 2010/0327564 | A1 | 12/2010 | Cheal |
| 2011/0018245 | A1 | 1/2011 | Hatfield et al. |
| 2011/0042923 | A1 | 2/2011 | Hatfield et al. |
| 2011/0057422 | A1 | 3/2011 | Cheal et al. |

FOREIGN PATENT DOCUMENTS

| | | |
|---|---|---|
| GB | 2309942 | 8/1997 |
| WO | WO-2004/087471 | 10/2004 |
| WO | WO 2006/097309 | 9/2006 |
| WO | WO 2007/018650 | 2/2007 |
| WO | WO 2008/109396 | 9/2008 |
| WO | WO 2008/144121 | 11/2008 |
| WO | WO-2011/022614 | 2/2011 |
| WO | WO-2011/031584 | 3/2011 |

OTHER PUBLICATIONS

Notification of Transmittal of the International Search Report and the Written Opinion of the International Searching Authority issued Sep. 4, 2008 in International Application No. PCT/US2008/059648.

Office Action issued May 4, 2009 in co-pending U.S. Appl. No. 11/803,238.

Amendment and Response to Office Action filed Nov. 4, 2009 in co-pending U.S. Appl. No. 11/803,238.

Co-pending U.S. Appl. No. 12/555,486, filed Sep. 8, 2009.

Amendment and Response to Office Action filed Mar. 31, 2011 in co-pending U.S. Appl. No. 12/495,243, now published as U.S. Publication No. US 2010/0327564.

Office Action mailed Nov. 4, 2010 in co-pending U.S. Appl. No. 12/544,952, now published as U.S. Publication No. US 2011/0042923.

Notification of Transmittal of the International Search Report and the Written Opinion of the International Searching Authority issued Mar. 14, 2011 in International Application No. PCT/US2011/021662.

Notice of Allowance and Fee(s) Due mailed Apr. 18, 2011 in co-pending U.S. Appl. No. 12/495,243, now issued as U.S. Patent No. 7,980,585.

Amendment and Response filed May 4, 2011 in co-pending U.S. Appl. No. 12/544,952, now published as U.S. Publication No. US 2011/0042923.

Final Office Action mailed Jun. 27, 2011 in co-pending U.S. Appl. No. 12/544,952, now published as U.S. Publication No. US 2011/0042923.

Amendment and Response filed Apr. 18, 2011 in co-pending U.S. Appl. No. 12/507,699, now published as U.S. Publication No. US 2011/0018245.

Notice of Allowance mailed Jun. 27, 2011 in co-pending U.S. Appl. No. 12/507,699, now published as U.S. Publication No. US 2011/0018245.

Office Action issued Apr. 16, 2007 in U.S. Appl. No. 11/068,662, now U.S. Patent No. 7,357,408.

Amendment and Response to Office Action filed Oct. 16, 2007 in U.S. Appl. No. 11/068,662, now U.S. Patent No. 7,357,408.

Notice of Allowance and Fee(s) Due issued Dec. 4, 2007 in U.S. Appl. No. 11/068,662, now U.S. Patent No. 7,357,408.

Office Action issued Mar. 26, 2008 in U.S. Appl. No. 11/192,258, now U.S. Patent No. 7,547,038.

Response to Requirement for Election filed May 23, 2008 in U.S. Appl. No. 11/192,258, now U.S. Patent No. 7,547,038.

Office Action issued Aug. 8, 2008 in U.S. Appl. No. 11/192,258, now U.S. Patent No. 7,547,038.

Amendment and Response to Office Action filed Nov. 25, 2008 in U.S. Appl. No. 11/192,258, now U.S. Patent No. 7,547,038.

Notice of Non-Compliant Amendment issued Dec. 8, 2008 in U.S. Appl. No. 11/192,258, now U.S. Patent No. 7,547,038.

Interview Summary issued Dec. 9, 2008 in U.S. Appl. No. 11/192,258, now U.S. Patent No. 7,547,038.

Response to Notice of Non-Compliant Amendment filed Dec. 10, 2008 in U.S. Appl. No. 11/192,258, now U.S. Patent No. 7,547,038.

Notice of Allowance and Fee(s) Due issued Dec. 24, 2008 in U.S. Appl. No. 11/192,258, now U.S. Patent No. 7,547,038.

Summary of Interview filed Jan. 5, 2009 in U.S. Appl. No. 11/192,258, now U.S. Patent No. 7,547,038.

Request for Continued Examination filed Jan. 21, 2009 in U.S. Appl. No. 11/192,258, now U.S. Patent No. 7,547,038.

Notice of Allowance and Fee(s) Due issued Feb. 27, 2009 in U.S. Appl. No. 11/192,258, now U.S. Patent No. 7,547,038.

Office Action issued Feb. 24, 2009 in U.S. Appl. No. 11/714,037, now U.S. Patent No. 7,641,220.

Amendment and Response to Office Action issued Aug. 24, 2009 in U.S. Appl. No. 11/714,037, now U.S. Patent No. 7,641,220.

Notice of Allowance and Fee(s) Due issued Sep. 16, 2009 in U.S. Appl. No. 11/714,037, now U.S. Patent No. 7,641,220.

Office Action issued Mar. 10, 2010 in co-pending U.S. Appl. No. 11/803,238, now U.S. Publication No. US-2008/0284142.

Amendment and Response to Office Action filed Jun. 4, 2010 in co-pending U.S. Appl. No. 11/803,238, now U.S. Publication No. US-2008/0284142.

Notice of Allowance and Fee(s) Due issued Jul. 9, 2010 in co-pending U.S. Appl. No. 11/803,238, now U.S. Publication No. US-2008/0284142.

Request for Continued Examination filed Aug. 9, 2010 in co-pending U.S. Appl. No. 11/803,238, now U.S. Publication No. US 2008/0284142.

Notice of Allowance issued Sep. 14, 2010 in co-pending U.S. Appl. No. 11/803,238, now U.S. Publication No. US 2008/0284142.

Restriction Requirement issued Aug. 11, 2010 in co-pending U.S. Appl. No. 12/544,952.

Amendment and Response to Requirement for Election of Species filed Oct. 11, 2010 in co-pending U.S. Appl. No. 12/544,952.

Notification of Transmittal of the International Search Report and the Written Opinion of the International Searching Authority issued May 2, 2006 in International Application No. PCT/US2006/017127.

Notification of Transmittal of the International Search Report and the Written Opinion of the International Searching Authority issued Sep. 29, 2008 in International Application No. PCT/US2008/055420.

Co-pending U.S. Appl. No. 12/495,243, titled Airbag Mounting Assemblies With Double-Locking Wrappers, filed Jun. 30, 2009.

Co-pending U.S. Appl. No. 12/544,952, titled Inflatable Airbag Assemblies With Alignment Apertures, filed Aug. 20, 2009.

Co-pending U.S. Appl. No. 12/507,699, titled Inflatable Airbag Assemblies With Modular Components and Related Methods of Manufacture, filed Jul. 22, 2009.

Amendment and Response to Requirement of Election of Species filed Oct. 7, 2011 in co-pending U.S. Appl. No. 12/555,486, now published as U.S. Publication No. US 2011/0057422.

Amendment and Response to Final Office Action filed Aug. 29, 2011 in co-pending U.S. Appl. No. 12/544,952, now published as U.S. Publication No. US 2011/0042923.

Notice of Allowance and Fee(s) Due mailed Sep. 13, 2011 in co-pending U.S. Appl. No. 12/544,952, now published as U.S. Publication No. US 2011/0042923.

* cited by examiner

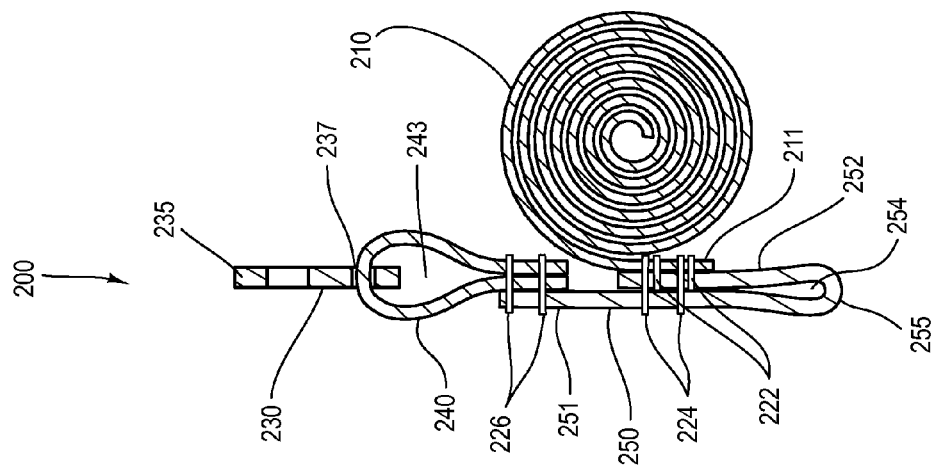
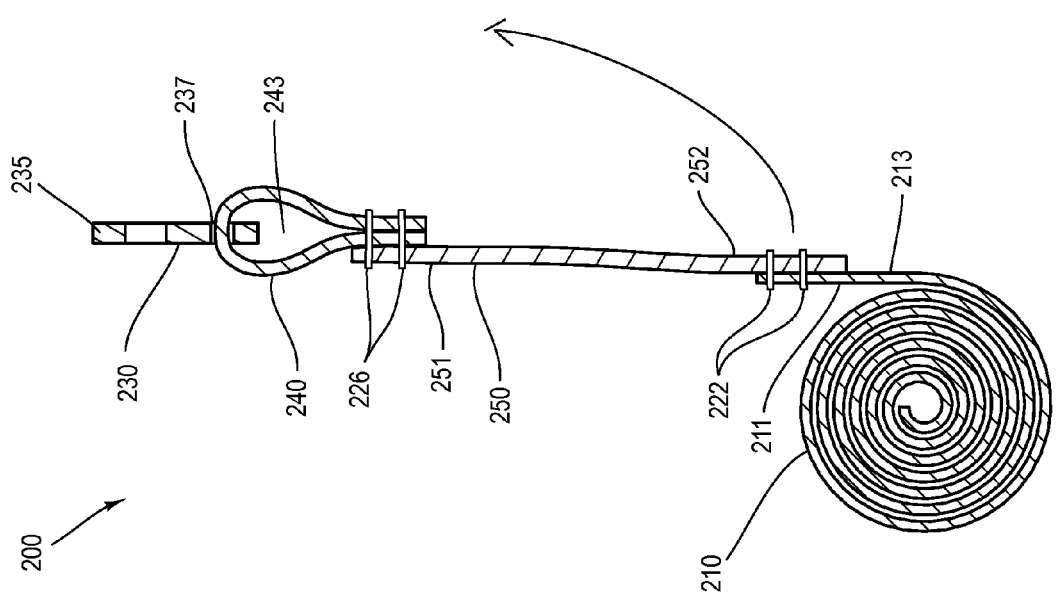

DOUBLE-SEWN AIRBAG MOUNTING ASSEMBLIES

TECHNICAL FIELD

The present disclosure relates generally to the field of automotive protective systems. More specifically, the present disclosure relates to mounting assemblies for inflatable curtain airbags and related methods.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the disclosure's scope, the embodiments will be described and explained with specificity and detail in reference to the accompanying drawings.

FIG. 7A is a cross-sectional view of the airbag assembly of FIG. 6.

FIG. 7B is a cross-sectional view of the airbag assembly of FIG. 7A after a portion of the assembly has been folded and re-sewn to the airbag.

DETAILED DESCRIPTION OF PREFERRED EMBODIMENTS

Figure 1A:
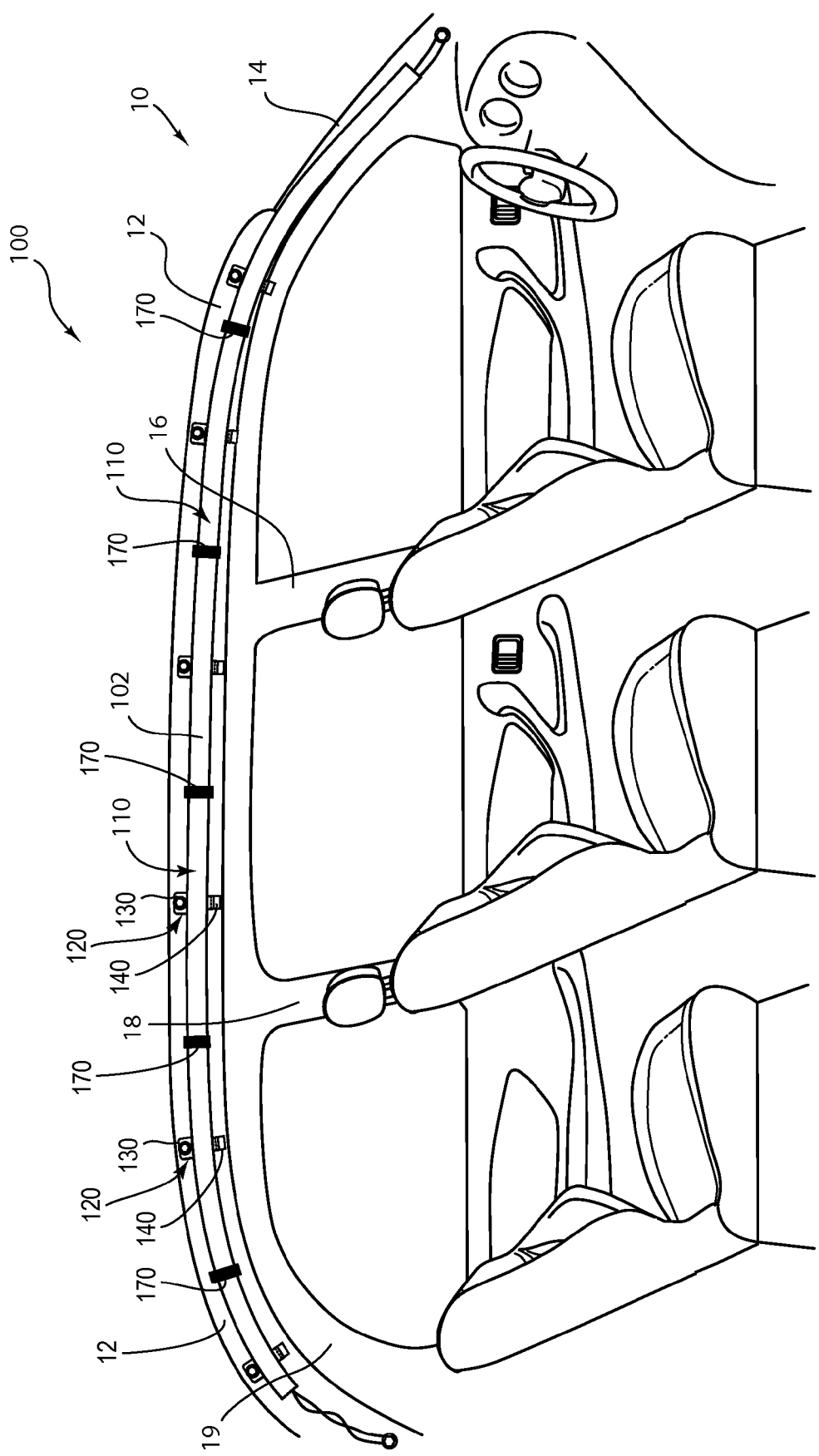
FIG. 1A is a perspective view of one embodiment of an airbag assembly, wherein the airbag assembly comprises a mounting assembly that is coupled to an airbag, and wherein the mounting assembly is coupling the airbag to a vehicle and the airbag is being retained in a packaged configuration.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to the roof rail of the vehicle, in an overhead position, or at the knee or leg position. In the following disclosure, "airbag" may refer to an inflatable curtain airbag, overhead airbag, front airbag, or any other airbag type.

An inflatable curtain airbag may be used to protect the passengers of a vehicle during a side collision or roll-over collision. Inflatable curtain airbags typically extend longitudinally within the vehicle and are usually coupled to or next to the roof rail of the vehicle. The inflatable curtain airbag may expand in a collision scenario along the side of the vehicle between the vehicle passengers and the side structure of the vehicle. In a deployed state, an inflatable curtain airbag may cover at least a portion of side windows and a B-pillar of the vehicle. In some embodiments, the inflatable curtain airbag may extend from an A-pillar to a C-pillar of the vehicle. In other embodiments, the inflatable curtain airbag may extend from the A-pillar to a D-pillar of the vehicle.

An inflatable curtain airbag is typically installed adjacent the roof rail of a vehicle in an undeployed state, in which the inflatable curtain airbag is rolled or folded or a combination thereof and retained in the folded or rolled configuration by being wrapped at certain points along the airbag. In this state, the airbag may be said to be in a packaged configuration. When deployed, the airbag exits the packaged configuration and assumes an extended shape. The extended and inflated airbag may be said to be in a deployed configuration. Thus, an airbag mounting apparatus typically allows for a secure connection between the vehicle and the airbag, yet allows the airbag to change configurations from the packaged configuration to the deployed configuration.

FIG. 1A depicts airbag assembly 100 from a perspective view, wherein a mounting assembly 120 is coupled to an inflatable curtain airbag 110 that is in a packaged configuration, and is mounted adjacent a roof rail 12 of a vehicle 10. Airbag assembly 100 may comprise an inflatable curtain airbag 110, and an airbag mounting assembly 120. A plurality of mounting assemblies 120 may be employed to couple curtain airbag 110 to a vehicle. Mounting assembly 120 may comprise a mounting member 130 and a connecting member 140. In FIG. 1A, only a bottom portion of the connecting member is visible. An optional wrapper 170 may also be employed to retain the airbag in the packaged configuration. For clarity, in the depiction of FIG. 1A, wrapper 170 is darkly colored; however, the wrapper need not be colored differently than any other component of the assembly. In some embodiments, the wrapper may be coupled to one or more components of the mounting assembly, and therefore may be considered a component of the mounting assembly. Mounting assembly 120 may be employed to couple inflatable curtain airbag 110 adjacent a vehicle roof rail 12, or other vehicle structure. Airbag assembly 100 may further comprise an inflator (not shown). In the depicted embodiment, inflatable curtain airbag 110 extends from an A-pillar 14 to a D-pillar 19. Inflatable curtain airbag 110 also extends past a B-pillar 16 and a C-pillar 18 such that in a deployed configuration, the inflatable curtain airbag at least partially covers the B- and C-pillars, as depicted in FIG. 1B.

Figure 1B:
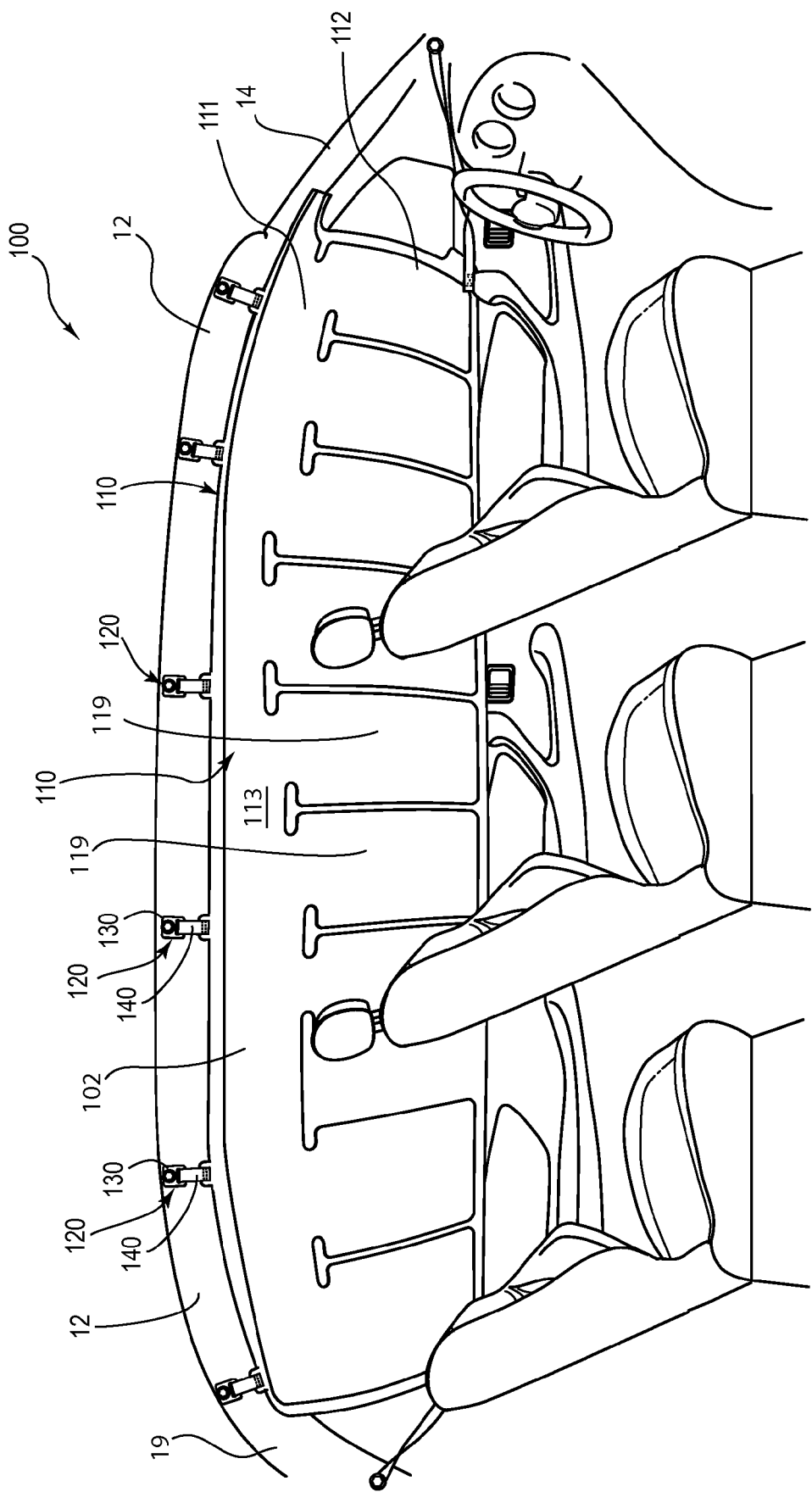
FIG. 1B is a perspective view of the airbag assembly of FIG. 1A, wherein the airbag is in a deployed configuration.

FIG. 1B is a perspective view of inflatable curtain airbag assembly 100, wherein the airbag is depicted in a deployed configuration. Inflatable curtain airbag 110 is configured to become inflated upon activation of one or more inflators such that the airbag transitions from the packaged configuration to the deployed configuration. During deployment, wrapper 170 is configured to rupture such that inflatable curtain airbag 110 can adopt the deployed configuration. In the deployed and in an extended configuration, such as before rolling and/or folding, inflatable curtain airbag 110 may be described as having an upper portion 111, a lower portion 112, a first face 113, and a second face (not visible). The various faces of inflatable curtain airbag 110 define an inflatable void, which is in fluid communication with an inflator (not visible). The inflatable void may be divided into inflation cells 119 via stitching. The various faces of inflatable curtain airbag 110 may comprise panels of a woven nylon fabric that are coupled together at a seam to form the inflatable void.

Upper portion 111 of inflatable curtain airbag 110 is the portion of the airbag that is closest to the headliner of a vehicle when the airbag is in a deployed state. Lower portion 112 is below upper portion 111 when inflatable curtain airbag 110 is in a deployed state, and is closest to a floor of the vehicle. The term "lower portion" is not necessarily limited to the portion of inflatable curtain airbag 110 that is below a horizontal medial plane of the inflatable curtain airbag, but may include less than half, more than half or exactly half of the bottom portion of the inflatable curtain airbag. Likewise, the term "upper portion" is not necessarily limited to the portion of inflatable curtain airbag 110 that is above a horizontal medial plane of the airbag, but may include less than half, more than half or exactly half of the top portion of the airbag.

Upon activation, the inflator rapidly generates and/or releases inflation gas, which rapidly inflates the inflatable curtain airbag 110. The inflator may be one of several types, such as pyrotechnic, stored gas, or a combination inflator and may comprise a single or multistage inflator. As inflatable curtain airbag 110 becomes inflated, tension is applied to wrapper 170, which causes the wrapper to rupture, and therefore, cease to retain the airbag in the packaged configuration.

As will be appreciated by those skilled in the art, a variety of types and configurations of inflatable curtain airbags can be utilized without departing from the scope and spirit of the present disclosure. For example, the size, shape, and proportions of the inflatable curtain airbag may vary according to its use in different vehicles or different locations within a vehicle. Also, the inflatable curtain airbag may comprise one or more of any material well known in the art, such as a woven nylon fabric. Additionally, the inflatable curtain airbag may be manufactured using a variety of techniques such as one piece weaving, cut and sew, or a combination of the two techniques. Further, the inflatable curtain airbag may be manufactured using sealed or unsealed seams, wherein the seams are formed by stitching, adhesive, taping, radio frequency welding, heat sealing, or any other suitable technique or combination of techniques.

Figure 2A:
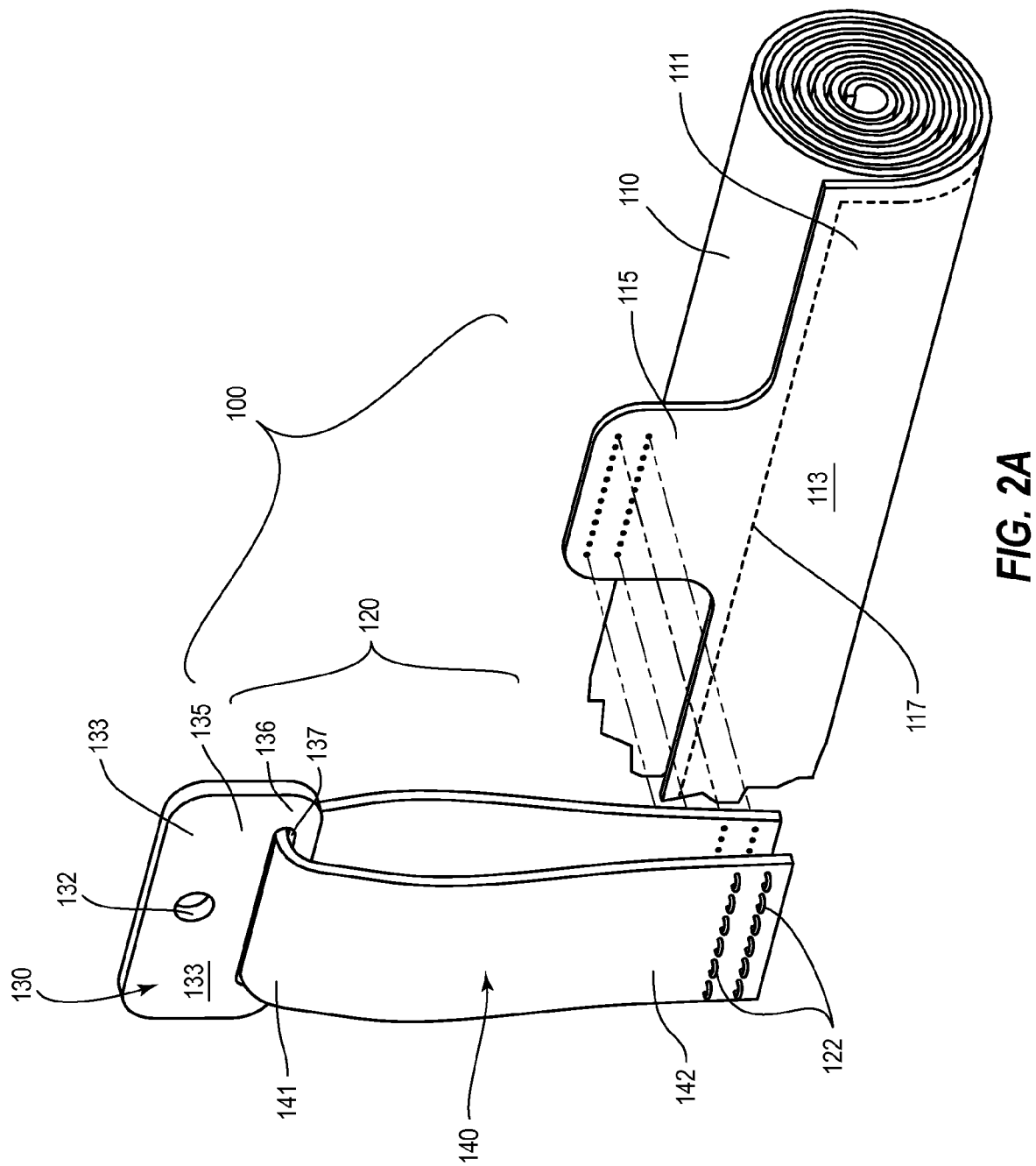
FIG. 2A is an exploded perspective view of the airbag assembly of FIG. 1A, wherein the airbag has been partially cutaway.
Figure 2B:
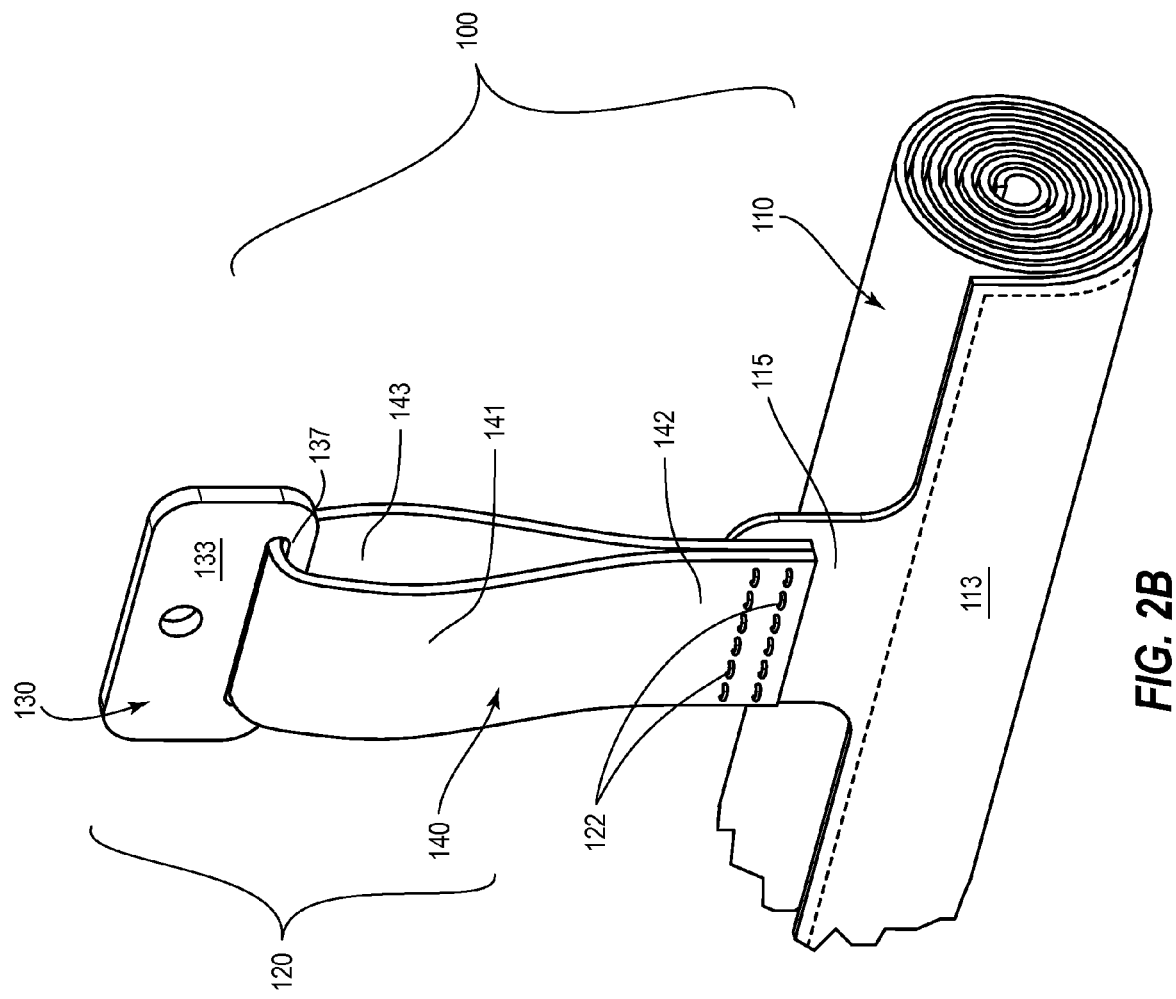
FIG. 2B is a cutaway perspective view of the airbag assembly of FIG. 2A, wherein the mounting assembly has been coupled to the airbag.
Figure 2C:
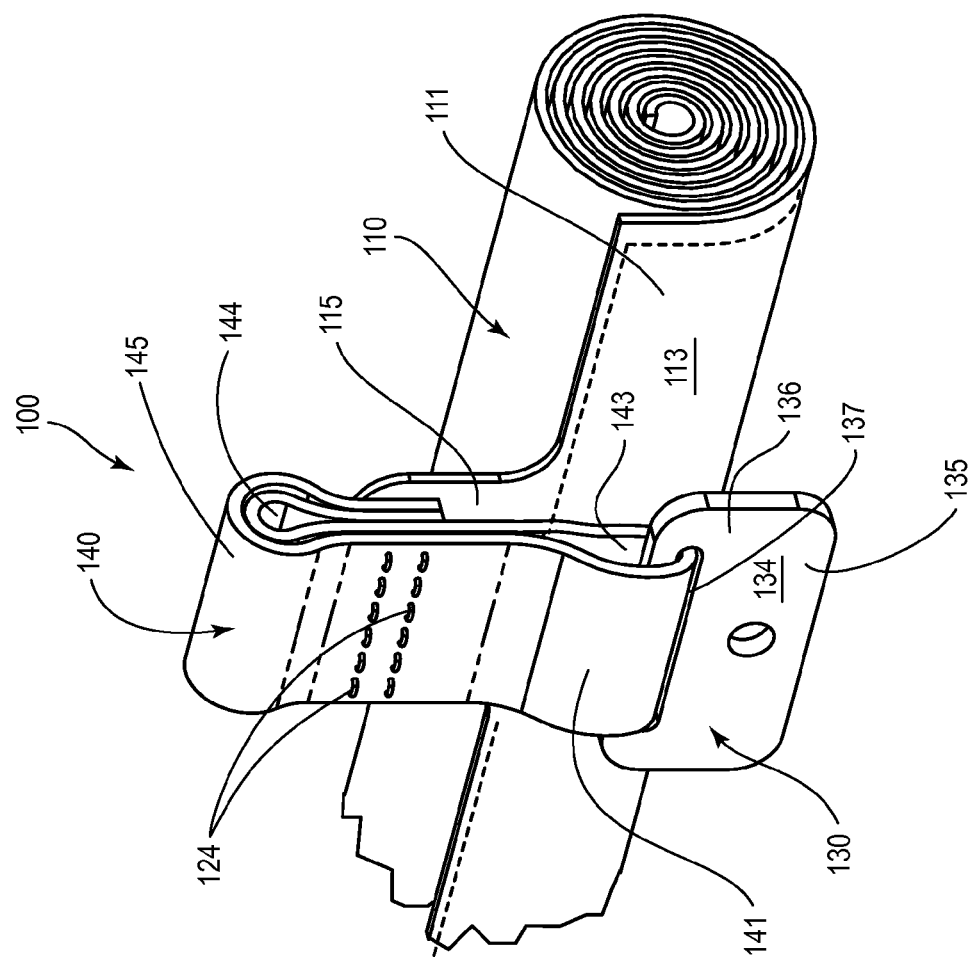
FIG. 2C is a cutaway perspective view of the airbag assembly of FIG. 2B, wherein a portion of the mounting assembly has been folded over and re-sewn to the airbag.

Collectively, FIGS. 2A-2C, and their associated text, may be said to comprise a method for manufacturing an inflatable curtain airbag assembly, a method for manufacturing a mounting assembly, a method for packing an inflatable curtain airbag, a method for coupling an inflatable curtain airbag to a vehicle, and any combination of the preceding methods.

FIGS. 2A-2C depict airbag assembly 100 and mounting assembly 120 from various views.

FIG. 2A depicts airbag assembly 100 from an exploded perspective view in which inflatable curtain airbag 110 is partially cutaway. Mounting assembly 120 may comprise mounting member 130 and Connecting member 140. Mounting member 130 may comprise a rigid planar member comprising a metal alloy, or in some embodiments, the mounting member may comprise a flexible fabric, such as a woven nylon material. Mounting member 130 has a mounting aperture 132, a first side 133, a second side (not visible), a top portion 135, a bottom portion 136, and a connecting aperture 137. Top and bottom portions 135 and 136 refer to an approximate upper half and lower halves, respectively, when mounting member 130 is in the same orientation as depicted in FIG. 2A.

Mounting aperture 132 is located on top portion 135 and is configured to receive a fastener, such as a bolt or a mounting structure coupled to the vehicle that protrudes through the aperture. Connecting aperture 137 comprises an elongated slot and is located on lower portion 137 and is configured to receive connecting member 140. In some embodiments, mounting member 130 may not comprise a connecting aperture. In such embodiments, the connecting member may be coupled to the mounting member without the use of an aperture in the connecting member.

One skilled in the art will also recognize that a variety of types of materials may be used to form the mounting member without departing from the spirit of this disclosure. For example, in one embodiment, the mounting member comprises a piece of material, such as nylon webbing. Further, the mounting member may comprise a variety of shapes. For example, the mounting member may be square, triangular, round, or pentagonal. Further, the mounting member may comprise more or fewer apertures than described herein. For example, in one embodiment, the mounting member comprises two mounting apertures, and in another embodiment, the mounting member comprises three mounting apertures. Further, the location of the apertures may vary from the depictions of the figures.

Connecting member 140 comprises a flexible fabric, such as a woven nylon. Connecting member 140 comprises a predetermined length and a predetermined width. The length of the connecting member may vary according to use in different vehicles such that the curtain airbag is located in a predetermined position, with reference to its vertical placement. Connecting member 140 comprises a first portion 141 and a second portion 142. Generally, it may be said that first portion 141 is an upper portion and second portion 142 is a lower portion. Both the first and second portions 141 and 142 comprise two layers of the connecting member.

First portion 141 is that portion of connecting member 140 that is received by connecting aperture 137 of mounting member 130. In other words, connecting member 140 extends through connecting aperture 137. Shear-configuration stitching 122 may be employed to attach second portion 142 of connecting member 140 to inflatable curtain airbag 110. "Shear-configuration" refers to the orientation of the stitching relative to the airbag and a direction of tension that may be placed on the stitching during airbag deployment, such as during a rollover event. In other words, A sheer configuration is any sewn seam that applies a shear load to the sewing thread itself, for example, overlap sew, or folded and overlapped.

In some embodiments, one of the layers of the connecting member does not extend all the way to the end of the other layer, as depicted in FIG. 2A. In such embodiments, additional stitching may be employed to form a loop portion in the first portion of the connecting member and separate stitching may be employed to attach the single layer of the second portion of the connecting member to the inflatable curtain airbag.

In some embodiments, the connecting member may also function as a wrapper, wherein the second portion of the connecting member/wrapper extends well below the point at which the connecting member/wrapper is attached to the inflatable curtain airbag. After the inflatable airbag curtain is rolled, the second portion of the connecting member/wrapper can be wrapped around the airbag and then interact with itself so that the airbag is retained in the rolled configuration. In another embodiment, a separate wrapper is employed, which is threaded through the connecting aperture of the mounting member such that after the airbag is rolled, the wrapper can wrap around the airbag and then interact with itself such that the airbag is retained in the rolled configuration.

Mounting member 130 and connecting member 140 are collectively referred to as a mounting assembly. The mounting member and connecting member may also be called a sub-assembly of an airbag assembly. In some embodiments, a tack stitch may be used to secure the mounting member and the connecting member prior to attachment to an airbag.

Figure 6:
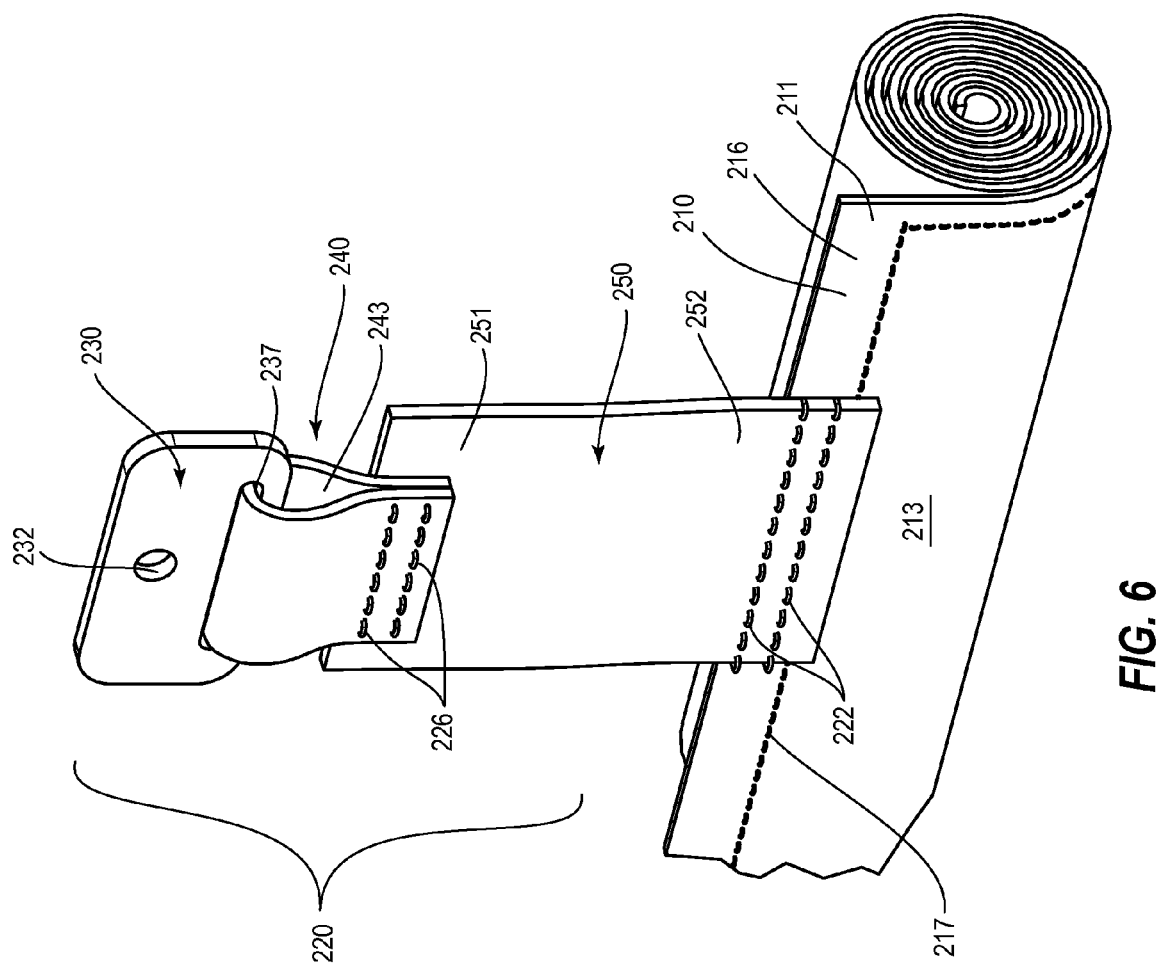
FIG. 6 is an exploded perspective view of another embodiment of an airbag assembly, wherein the airbag has been partially cutaway.

For clarity, inflatable curtain airbag 110 is cutaway in FIG. 2A. Curtain airbag 110 has been manipulated into a rolled configuration and oriented such that top portion 111 is turned upward, and first face 113 is facing forward, towards the viewer. In the rolled configuration, airbag 110 has an outer surface, which may be defined by first face 113 of the airbag. Top portion 111 of inflatable curtain airbag 110 may be coupled to mounting assembly 120 at second portion 142 of connecting member 140. Inflatable curtain airbag 110 may be coupled to the assembly at a non-inflatable portion, such as an area outside of seam 117. In the depicted embodiment, a tab 115 is formed in the non-inflatable area of the inflatable curtain airbag 110 such that the connecting member can be coupled to the airbag via shear-configuration stitching. In other embodiments, the inflatable curtain airbag may not comprise a tab, such that the connecting member is coupled to the non-inflatable portion that is outside the stitched seam that defines the inflatable void of the airbag. Shear-configuration stitching 122 may extend through four layers of material: the first and second layers of the connecting member and the first and second faces of the inflatable airbag curtain. One skilled in the art will recognize that mounting assembly 120 may be used in conjunction with an inflatable airbag curtain that does not have a tab, but rather, has a non-inflatable portion such as depicted in FIG. 6.

FIG. 2B is a perspective view of airbag assembly 100 and mounting assembly 120, as depicted in FIG. 2A after connecting member 140 has been attached to tab 115. For clarity, inflatable curtain airbag 110 has been partially cutaway in FIG. 2B. Connecting member 140 is coupled to mounting member 130 via a loop of the first portion 141 extending through connecting aperture 137 of the mounting member. In the depiction of FIG. 2B, first side 133 of mounting member 130 is facing the viewer. Rolled airbag 110 may be coupled to mounting member 130 via connecting member 140 at tab 115. Shear-configuration stitching 122 may be employed to attach connecting member 140 to tab 115. In the depicted embodiment, connecting member 140 is attached to inflatable curtain airbag 110 on first face 113 of the airbag; however, in other embodiments, the connecting member may be attached on the second face of the airbag. In yet other embodiments, the first layer of the connecting member may be attached on the first face of the airbag and the second layer of the connecting member may be attached on the second face of the airbag.

FIG. 2C depicts airbag assembly from perspective view, wherein inflatable curtain airbag 110 has been partially cut-away. FIG. 2C depicts airbag assembly 100 after connecting member 140 has been folded and re-sewn to cushion 110. In the depiction of FIG. 2C, cushion 110 is in the same orientation as in FIGS. 2A-2B, wherein upper portion 111 and tab 115 are oriented upwardly, and first face 113 is facing the viewer. FIG. 2C differs from FIG. 2B in that first portion 141 of connecting member 140 has been folded toward front face 113 such that from the viewer's perspective, top portion 135 of mounting member 130 is oriented downward, and bottom portion 136 of the mounting member is oriented upward; also, second side 134 of connecting member 130 is facing the viewer.

After connecting member 140 has been folded toward front face 113, the connecting member comprises a first loop 143, which is located at first portion 141, and a second loop 144, which is formed at second portion 142. Second loop 144 may also be described as a fold 145 of connecting member 140. Connecting member 140 may be retained in the folded configuration by being sewn with peel-configuration stitching 124, which may protrude through six layers of material: four layers of the connecting member and the first and rear faces of inflatable curtain airbag 110. "Peel-configuration" refers to the orientation of the stitching relative to the airbag and a direction of tension that may be placed on the stitching during airbag deployment, such as during a rollover event. In other words, peel configuration is any sewn seam that applies a tensile load to the sewing thread itself, for example, perimeter sews with inflatable area on one or both sides. A distance from the mounting aperture of the mounting member to the stitching that couples the inflatable curtain airbag to the connecting member is a parameter that can be tuned to alter deployment characteristics of the airbag.

One skilled in the art will recognize that a variety of sheer and peel configuration stitch types and threads can be employed without departing from the spirit of the present disclosure. Stitch types may be single or double needle lock type stitches Type 301 is most commonly used. Threads with a minimum of 1350 Dtex are used for these types of strength sews, and stitch count can vary from about 30 to about 55 stitches per 100 mm. Thread count may be three twisted yarns that are bonded and lubricated for sewing with compatible fabric. Thread base material may be nylon 6.6 and is compatible with the fabric being sewn. A full or partial back tack can also be used depending on the strength needed in the seam. In some embodiments, partial back tacks may not exceed about 10 mm. In some embodiments, full back tacks may be performed to allow spacing for the needle and thread passing the first sew, which may have about 1 mm offset. The geometry of the seam can be modified for optimal performance, and may comprise a moon shape, or a double row configuration. Seams for attaching modular components, such as mounting tabs or brackets, may extend across the entire length of the modular component. Table 1 provides data regarding threads that may be used in accordance with the present disclosure.

TABLE 1

| Tex Size | Decitex | US Ticket | Metric | Japan | Twisted Nylon | Twisted Poly |
|---|---|---|---|---|---|---|
| T-135 | 1350 | BT-138/3(RT) | M20 | 5 | 420 d × 3 | 420 d × 3 |
| T-210 | 2100 | ST-207/3 | M13 | 4 | 630 d × 3 | 630 d × 3 |

Figure 3:
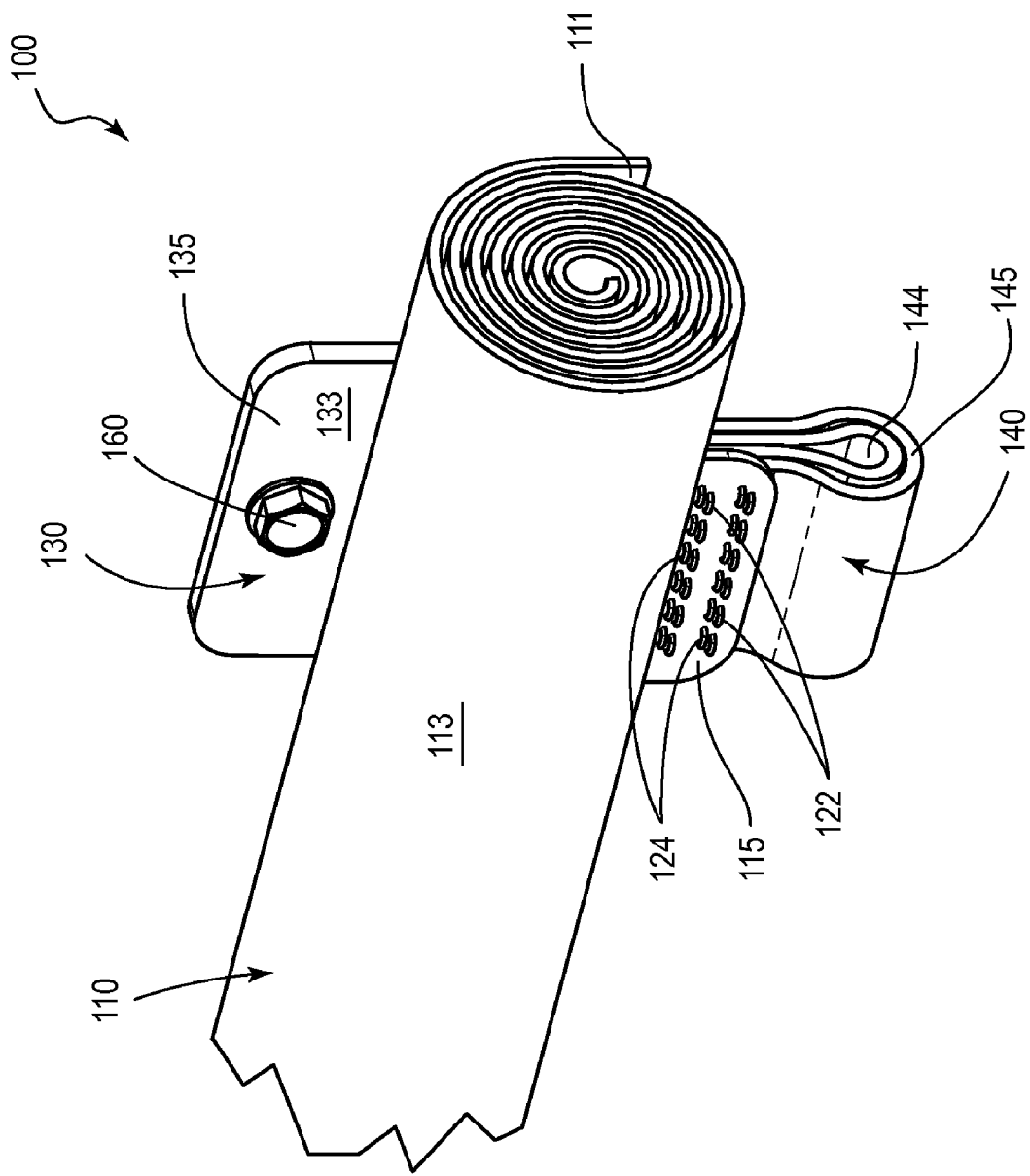
FIG. 3 is another cutaway perspective view of the airbag assembly of FIG. 2C.

FIG. 3 is another cutaway perspective view of airbag assembly 100 of FIG. 2C, wherein airbag assembly has been rotated 180° vertically compared to FIG. 2C. In the depiction of FIG. 3, first face 133 of connecting member 130 is facing the viewer and top portion 135 is oriented upward; also, upper portion 111 of inflatable airbag curtain 110 is facing downward, as is second loop 144 of connecting member 140. Second loop 144 is formed by fold 145, and if fold 145 is formed tightly, second loop 144 may be compressed. In the depiction of FIG. 3, airbag 100 may be said to be in a "b-roll" configuration.

The orientation of assembly 100 in FIG. 3 is the same orientation depicted in FIG. 1A. As such, bolt 160 may protrude through the mounting aperture of mounting member 130 and extend into a complementary aperture formed in the roof rail of a vehicle (not shown). For clarity, first face 113 of inflatable curtain airbag 110, which defines and outer surface of the airbag, is depicted as being located such that tab 115, as well as shear-configuration stitching 122 and peel-configuration stitching 124 are visible; however, the diameter of the rolled inflatable curtain airbag may be such that when the airbag is in a packaged configuration, the tab and stitching are not visible.

Figure 4B:
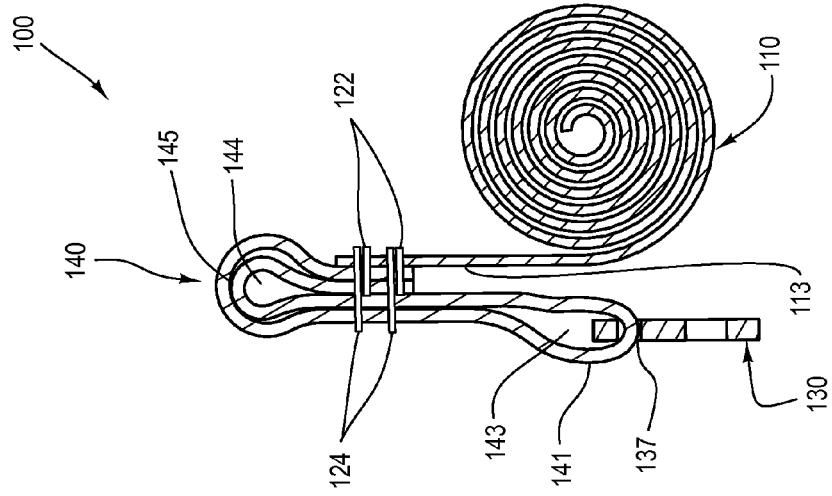
FIG. 4B is a cross-sectional view of the airbag assembly of FIG. 4A after the mounting assembly has been folded and re-sewn.
Figure 4A:
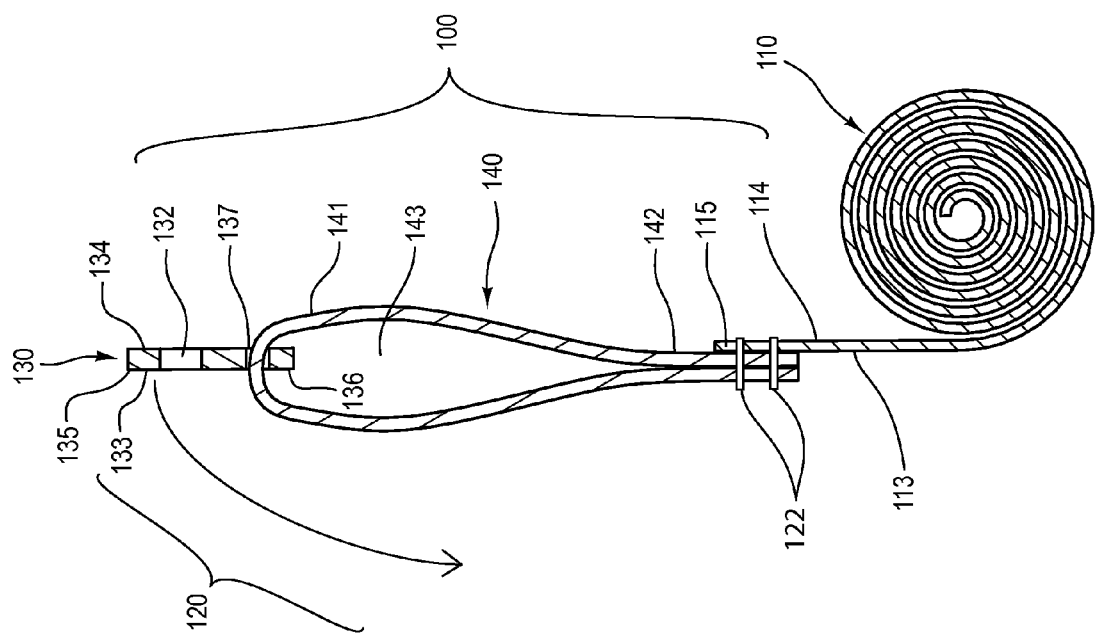
FIG. 4A is a cross-sectional view of the airbag assembly of FIG. 1A before the mounting assembly has been folded and re-sewn.

FIGS. 4A and 4B are cross-sectional views of airbag assembly 100, wherein FIG. 4A depicts the assembly before connecting member 140 has been folded and FIG. 4B depicts the assembly after the connecting member has been folded and re-sewn. In the depiction of FIG. 4A, mounting assembly 120 is attached to tab 115 of inflatable airbag cushion 110 on first face 113 of the airbag. In the depiction of FIG. 4A, first side 133 of mounting member 130 and first face 113 of airbag 110 are facing to the viewer's left and second side 134 and second face 114 are facing to the viewers right. Top portion 135 of mounting member 130 is topmost and includes mounting aperture 132. Bottom portion 136 includes connecting aperture 137 and is below top portion 135. First portion 141 of connecting member 140 protrudes through connecting aperture 137 and second portion 142 is attached to tab 115 via shear-configuration stitching 122, which forms first loop 143. Shear-configuration stitching 122 protrudes through two layers of the connecting member.

FIG. 4B depicts airbag assembly 100 of FIG. 4A after mounting bracket 130 and first portion 141 of connecting member 140 have been directed downward toward first face 113 of airbag 110. Folding connecting member 140 at fold 145 forms a second loop 144, which in the depiction of FIG. 4B is above first loop 143. First loop 143 is captured by connecting aperture 137. Connecting member 140 is retained in the folded configuration via peel-configuration stitching 124, which protrudes through four layers of the connecting member. Shear-configuration stitching 122 protrudes through two layers of connecting member 140. In the depiction of FIG. 4B, shear-configuration stitching 122 and peel-configuration stitching 124 are in distinct positions and each comprise two rows of stitching. One skilled in the art will recognize that shear-configuration stitching 122 and peel-configuration stitching 124 may not be located in distinct positions, in which case the threads of the stitching may become mingled. Additionally, shear-configuration and peel-configuration stitching 122 and 124 are depicted as each having two rows of stitches; however, one skilled in the art will recognize that the stitching may comprise fewer or more than two rows of stitching.

Figure 5:
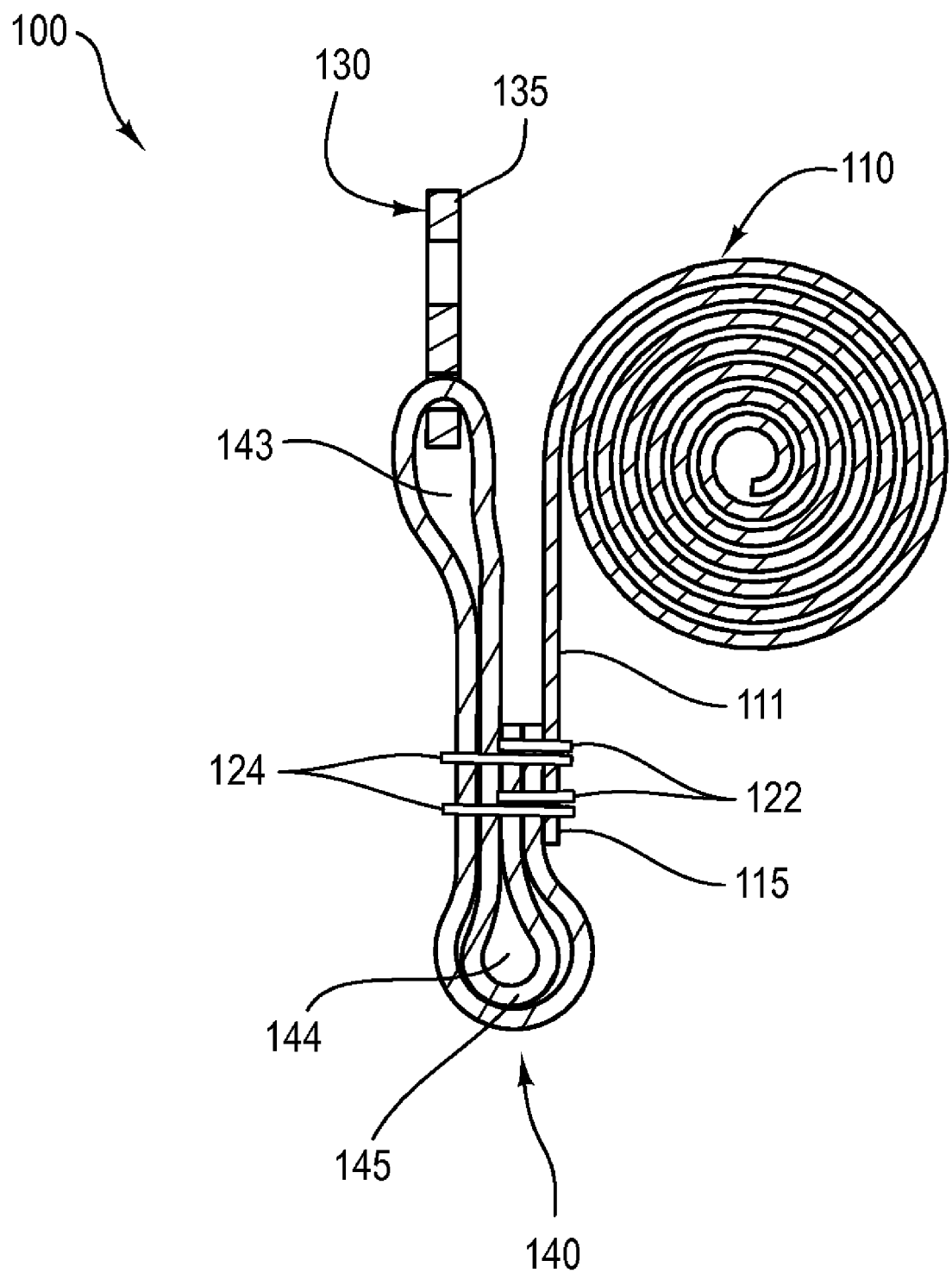
FIG. 5 is another cross-sectional view of the airbag assembly of FIG. 1A.

FIG. 5 depicts assembly 100 of FIG. 4B, wherein the assembly has been rotated 180° vertically and horizontally. The orientation of assembly 100 in FIG. 5 is similar to how the assembly may be mounted in a vehicle if a roof rail were located on the left hand side of the figure, as seen by the viewer. In the depiction of FIG. 5, top portion 135 of mounting member 130 is above bottom portion 136 and first loop 143 is above second loop 144 and fold 145. Upper portion 111 and tab 115 of cushion 110 are oriented downward. Upon inflatable curtain airbag 110 deployment, the airbag may change configuration from the packaged state to an extended state.

In the depiction of FIG. 5, inflatable curtain cushion 110 appears to comprise a single layer of material; however, as described above, cushion 110 may comprise a first and a second panel of material such that the cushion comprises two layers of material. As such, shear configuration stitching 122 protrudes through four layers of material and peel configuration stitching 124 protrudes through six layers of material.

Inflatable curtain airbag deployment trajectory and characteristics are important aspects in the airbag's performance. A b-roll configuration is preferred due to its favorable deployment trajectory and characteristics; however, to be properly oriented within a vehicle, an inflatable curtain airbag is typically coupled to a mounting member via peel-configuration stitching. Peel-configuration stitching typically is not able to withstand a magnitude of tension equal to shear-configuration stitching, which is otherwise identical to the peel-configuration stitching. Airbag deployment and/or impact by an occupant during a rollover event may place a magnitude of tension on the peel-configuration stitching that is greater than their ability to withstand, but which may be withstood by shear-configuration stitching.

During inflatable curtain airbag 110 deployment, or upon being impacted by an occupant, peel-configuration stitching 124 may come under tension such that the stitching ruptures. In such a case, airbag assembly 100 may adopt a configuration similar to that depicted in FIG. 2B and FIG. 4A, wherein inflatable curtain airbag 110 remains anchored to the roof rail of the vehicle via shear-configuration stitching 122. As such, although peel-configuration stitching 124 may rupture during airbag deployment or when an occupant contacts the inflatable curtain airbag during a rollover event, shear-configuration stitching 122 are configured not to rupture and thereby retain airbag 110 in a predetermined position.

FIG. 6 depicts another embodiment of an airbag assembly 200 from a cutaway perspective view, wherein the airbag assembly comprises a mounting assembly 220 and an inflatable curtain airbag 210. Assembly 200 may be configured similarly and may function similarly as assembly 100, described herein. Mounting assembly 220 may comprise a mounting member 230, a first connecting member 240, and a second connecting member 250. Inflatable curtain cushion 210 may be configured similarly and may function similarly as inflatable curtain cushion 110, except cushion 210 does not have a tab 115 as does cushion 110. Cushion 210 comprises a perimeter seam 217 and a non-inflatable area 216 that is located outside of perimeter seam 217. Mounting assembly 220 may be attached to first face 213 of inflatable curtain airbag 210 at non-inflatable area 216, which is located along top portion 211 of cushion 210.

Mounting member 230 may be configured similarly and may function similarly as mounting member 130, described herein. Mounting member 230 comprises a mounting aperture 232 and a connecting aperture 237. First connecting member 240 may be configured similarly and may function similarly as connecting member 140, described herein, except first connecting member 240 is not attached to an inflatable curtain airbag; instead, first connecting member 240 is attached to a second connecting member 250 via first shear-configuration stitching 226. First connecting member 240 may comprise a flexible fabric that can be threaded through connecting aperture 237 such that a first loop 243 is formed when the connecting member is attached to second connecting member 250. FIG. 6 depicts first connecting member 240 as being attached to second connecting member 250 on a front face; however, as one skilled in the art will recognize, the connecting member may be attached to either face of the second connecting member, including both faces of the second connecting member.

Second connecting member 250 may comprise a flexible piece of fabric, which has a first portion 251 and a second portion 252, wherein the first and second portions may be considered approximate top and bottom halves of second connecting member 250. Top portion 251 is attached to first connecting member 240 via first shear-configuration stitching 226. Bottom portion 252 is attached to inflatable curtain airbag 210 at non-inflatable area 216 via second shear-configuration stitching 222. In other embodiments, the second connecting member may have an extended bottom portion, which functions as a wrapper.

One skilled in the art will recognize that the various connecting members described herein may be formed from a variety of materials. For example, the connecting members may be formed from one or more layers of Uncoated flat woven nylon fabric of high construction, such as 19×19 yarns per centimeter. Examples of suitable materials include 470 Dtex f 136-144 (19×19 yarns per centimeter) and 700 Dtex f 105-108 (16×16 yarns per centimeter). Additionally, materials having variations in weave and yarn size may be used. Further, the fabrics can be used in multiple layers and/or fused together.

FIGS. 7A and 7B are cross sectional views depicting inflatable curtain airbag assembly 200, wherein FIG. 7A depicts the assembly before the second connecting member has been folded and FIG. 7B depicts the assembly after the second connecting member has been folded and re-sewn. In both figures, top portion 235 of mounting member 230 is topmost such that connecting aperture 237 is located below the top portion. First connecting member 240 has been captured by connecting aperture 237 and attached to second connecting member 250 via first shear-configuration stitching 226 such that first loop 243 is formed.

FIG. 7A depicts assembly 200 before second connecting member 250 has been folded. Top portion 251 of second connecting member 250 is coupled to first connecting member 240 and bottom portion 252 is attached to top portion 211 of inflatable curtain airbag 210 on front face 213 via first shear-configuration stitching 226. Assembly 200 as depicted in FIG. 7A can be manipulated into the configuration of FIG. 7B by directing bottom portion 252 of second connecting member 250 upwardly, in a direction that is opposite the side on which inflatable curtain airbag 210 is located.

FIG. 7B depicts assembly 200 after second connecting member 250 has been folded. In a second connecting member-folded configuration, top portion 211 of cushion 210 is directed away from top portion 235 of mounting member 230. The second connecting member-folded configuration may also be defined by a second loop 254 that is formed by a fold 255 in lower portion 252 of second connecting member 250. Second loop 254 may comprise a fold of second connecting member 250, wherein the fold, or an aperture of second loop 254, is oriented approximately parallel with a long axis of rolled inflatable airbag curtain 210. After second loop 254 has been formed, assembly 200 may be retained in the second connecting member-folded configuration via another peel-configuration stitching 224.

Assembly 200 may be mounted in a configuration similar to that depicted in FIG. 7B, and during inflatable curtain airbag 210 deployment, the airbag may unroll and assume an extended configuration. As described above for assembly 100, during inflatable curtain airbag 210 deployment or upon the airbag being impacted by an object during a rollover event, peel-configuration stitching 224 may fail. In such an event, the inflatable curtain airbag may be retained in position via second shear-configuration stitching 222, which may resemble the configuration depicted in FIG. 7A, except inflatable curtain cushion 210 would be in an extended configuration rather than a rolled configuration, as depicted in the figure.

In one example, a single mounting assembly attached to a portion of an inflatable airbag assembly was tested in a dynamic load drop testing fixture. The tested mounting assembly and airbag portion were configured as depicted in FIGS. 6-7B. The dynamic load drop testing fixture may be of any type well known in the art and comprises a mass, an anchor, a sample coupling mechanism, a load sensor, and a data acquisition system. To test what magnitude of force is required to rupture the peel and/or shear configuration stitching, as described herein, the mounting member or the first connecting member is coupled to an anchor portion via the sample coupling mechanism. The airbag portion can be coupled to the mass via another sample coupling mechanism such that the mounting member and airbag sample couples the anchored portion of the testing fixture and the mass such that force can be applied to the sample by dropping the mass. The magnitude of force can be measured by coupling a load sensor, or load cell, by coupling the load sensor to the sample somewhere between the mass and the anchor. The magnitude of the mass and the distance the mass is dropped can be tuned to alter the force applied to the sample. The magnitude of the force applied to the sample can be increased until the sample fails.

In the instant example, a double-sewn mounting assembly was tested in a dynamic load drop testing fixture. A magnitude of force was applied to the sample that was sufficient to rupture the peel configuration stitching and the shear configuration stitching. The peel configuration stitching failed when a force of about 1200 Newton was applied, and the shear configuration stitching failed when a force of about 2500 Newton was applied.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 ¶ 6. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An inflatable curtain airbag assembly, comprising:
  an inflatable curtain airbag having a non-inflatable area;
  a mounting member configured to couple the inflatable curtain airbag to a vehicle structure; and,
  a connecting member configured to interconnect the mounting member and the inflatable curtain airbag,
    wherein the connecting member comprises a flexible piece of fabric that is attached to the inflatable curtain airbag at the non-inflatable area via both shear-configuration stitching and peel-configuration stitching such that the inflatable curtain airbag can be packaged into a b-roll configuration, and,
    wherein upon deployment of the inflatable curtain airbag, if tension on the peel-configuration stitching is lower than a predetermined magnitude, the connecting member will remain in a first configuration, and if tension on the peel-configuration stitching is greater than the predetermined magnitude, the peel-configuration stitching will rupture and the connecting member will adopt a second configuration.

2. The inflatable curtain airbag assembly of claim 1, wherein upon failure of the peel-configuration stitching, the inflatable airbag curtain continues to be attached to the connecting member via the shear-configuration stitching.

3. The inflatable curtain airbag assembly of claim 1, wherein in the first configuration, the connecting member comprises a fold and is retained in a folded configuration by the peel-configuration stitches, and in the second configuration, the connecting member is no longer folded.

4. The inflatable curtain airbag assembly of claim 1, wherein a top portion of the inflatable airbag curtain is oriented so that an edge of the top portion is oriented downward when the connecting member is in the first configuration and when the connecting member is in the second configuration, the edge of the top portion is oriented upward.

5. An inflatable curtain airbag assembly, comprising:
  an inflatable curtain airbag having a non-inflatable area that is located on a top portion of the inflatable curtain airbag adjacent to a top edge;
  a mounting member configured to couple the inflatable curtain airbag to a vehicle structure; and,
  a connecting member configured to interconnect the mounting member and the inflatable curtain airbag,
    wherein the connecting member comprises a flexible piece of fabric that is configured to be attached to the inflatable curtain airbag at the non-inflatable portion via both a first shear-configuration stitching and peel-configuration stitching, and
    wherein the connecting member comprises a fold, and wherein the peel-configuration stitching retains the fold in the connecting member such that the connecting member comprises a folded configuration.

6. The inflatable curtain airbag assembly of claim 5, wherein the inflatable curtain airbag assembly is configured such that upon rupturing of the peel-configuration stitching, the connecting member adopts an unfolded configuration.

7. The inflatable curtain airbag assembly of claim 6, wherein the inflatable curtain airbag is in a b-roll configuration.

8. The inflatable curtain airbag assembly of claim 6, wherein the inflatable curtain airbag assembly further comprises a wrapper, which is configured to retain the inflatable curtain airbag in a packaged configuration.

9. The inflatable curtain airbag assembly of claim 6, wherein the connecting member is attached to the top portion of the inflatable curtain airbag such that in the folded configuration the top edge of the inflatable curtain airbag is oriented downward, and in the unfolded configuration, the top edge of the inflatable curtain airbag is oriented upward.

10. The inflatable curtain airbag assembly of claim 9, wherein the peel-configuration stitching protrudes through two layers of the connecting member.

11. The inflatable curtain airbag assembly of claim 9, wherein the peel-configuration stitching protrudes through four layers of the connecting member.

12. The inflatable curtain airbag assembly of claim 9, wherein the mounting member comprises a metal planar member with a mounting aperture that is configured to receive a bolt and a connecting aperture that is configured as an elongated slot.

13. The inflatable curtain airbag assembly of claim 12, wherein the connecting member protrudes through the connecting aperture and forms a loop that is closed by the first shear-configuration stitching.

14. The inflatable curtain airbag assembly of claim 13, wherein the first shear-configuration stitching that closes the connecting member loop also attaches the connecting member to the inflatable curtain airbag.

15. The inflatable curtain airbag assembly of claim 5, wherein the connecting member comprises a first connecting member and a second connecting member,
  wherein the first connecting member protrudes through a connecting aperture of the mounting member and forms a loop that is closed by a second shear-configuration stitching,
  wherein the second connecting member has an upper portion and a lower portion, and wherein the upper portion is attached to the first connecting member via the second shear-configuration stitching that closes the first connecting member loop, and the lower portion is attached to the inflatable curtain airbag via the first shear-configuration stitching.

16. The inflatable curtain airbag assembly of claim 15, wherein the second connecting member is folded to form the folded configuration, and wherein the peel-configuration stitching retains the second connecting member in the folded configuration.

* * * * *